United States Patent
Teruya et al.

(10) Patent No.: US 10,866,958 B2
(45) Date of Patent: Dec. 15, 2020

(54) DATA MANAGEMENT SYSTEM AND RELATED DATA RECOMMENDATION METHOD

(71) Applicant: HITACHI, LTD., Tokyo (JP)

(72) Inventors: Eri Teruya, Tokyo (JP); Kazuhide Aikoh, Tokyo (JP)

(73) Assignee: HITACHI, LTD., Tokyo (JP)

( * ) Notice: Subject to any disclaimer, the term of this patent is extended or adjusted under 35 U.S.C. 154(b) by 143 days.

(21) Appl. No.: 16/128,664

(22) Filed: Sep. 12, 2018

(65) Prior Publication Data

US 2019/0303485 A1    Oct. 3, 2019

(30) Foreign Application Priority Data

Mar. 27, 2018  (JP) ................................ 2018-060474

(51) Int. Cl.
*G06F 16/2457*   (2019.01)
*G06F 16/2458*   (2019.01)
*G06F 16/248*    (2019.01)

(52) U.S. Cl.
CPC ........ *G06F 16/2465* (2019.01); *G06F 16/248* (2019.01); *G06F 16/24573* (2019.01); *G06F 16/24578* (2019.01)

(58) Field of Classification Search
CPC ............... G06F 16/2457–24578; G06F 16/248
See application file for complete search history.

(56) References Cited

U.S. PATENT DOCUMENTS

| 8,001,125 | B1 * | 8/2011 | Magdalin | ................ G06F 16/36 |
| | | | | 707/737 |
| 9,305,084 | B1 * | 4/2016 | McCann | ........... G06F 16/24578 |
| 9,367,609 | B1 * | 6/2016 | Mianji | .................... G06F 16/35 |
| 10,089,399 | B2 * | 10/2018 | Gadepalli | ............. G06F 16/248 |

(Continued)

FOREIGN PATENT DOCUMENTS

| JP | 2000-250922 A | 9/2000 |
| JP | 2002-189754 A | 7/2002 |

(Continued)

OTHER PUBLICATIONS

Office Action, dated Sep. 3, 2019, which issued during the prosecution of Japanese Patent Application No. 2018-060474, which corresponds to the present application (with English translation attached).

(Continued)

*Primary Examiner* — Robert W Beausoliel, Jr.
*Assistant Examiner* — Nirav K Khakhar
(74) *Attorney, Agent, or Firm* — Baker Botts L.L.P.

(57) ABSTRACT

An object of the present invention is to acquire exact related data in short time. The present invention relates to a data management system, the data management system is configured by a computer provided with an arithmetic unit that executes predetermined processing and a storage connected to the arithmetic unit, and the data management system is provided with a presentation unit that presents relationship between tags to a user and accepts selection of the relationship between tags and a determination unit that determines related data to be recommended on the basis of tags applied to data acquired in retrieval, referring to the selected relationship between tags.

12 Claims, 17 Drawing Sheets

| RECORD NUMBER | RELATIONSHIP NAME | KEY TAG | RELATION TAG |
|---|---|---|---|
| 1 | RELATIONSHIP TO ANTERIOR PROCESS | PRESS PROCESS | - |
| 2 | | COATING PROCESS | PRESS PROCESS |
| 3 | | ASSEMBLY PROCESS | PRESS PROCESS, COATING PROCESS, |
| 4 | | WORKING PROCESS | PRESS PROCESS, COATING PROCESS, ASSEMBLY PROCESS |
| ⋮ | ⋮ | ⋮ | ⋮ |
| 10 | RELATIONSHIP TO MASTER DATA | FACILITY CHECK RECORD, OPERATION LOG, FACILITY SENSOR, --- | FACILITY MASTER DATA |
| 11 | | STAFF INFORMATION, DUTY INFORMATION, WORK CONTENTS, --- | PERSONNEL MASTER DATA |
| 12 | | PRODUCTION PLANNING, PRODUCTION PROCEDURE, DESIGN SPECIFICATION, --- | PRODUCTION METHOD MASTER DATA |
| ⋮ | ⋮ | ⋮ | ⋮ |

1230   1231   1232   1233                        123

TAGS RELATIONSHIP DEFINITION TABLE

(56) References Cited

U.S. PATENT DOCUMENTS

| | | |
|---|---|---|
| 2005/0091207 A1 | 4/2005 | Shimizu et al. |
| 2009/0240692 A1* | 9/2009 | Barton ............... G06F 16/48 |
| 2010/0262477 A1* | 10/2010 | Hillerbrand ........ G06Q 30/0214 |
| | | 705/14.16 |
| 2012/0290518 A1* | 11/2012 | Flinn ............. G06F 16/24575 |
| | | 706/12 |
| 2012/0320248 A1* | 12/2012 | Igarashi ............ H04N 5/23293 |
| | | 348/333.01 |
| 2013/0226865 A1* | 8/2013 | Munemann .......... G06F 3/0482 |
| | | 707/609 |
| 2014/0156646 A1* | 6/2014 | Brust ............... G06F 16/435 |
| | | 707/722 |
| 2014/0164318 A1* | 6/2014 | Tsai ................ G06F 16/958 |
| | | 707/609 |
| 2014/0201180 A1* | 7/2014 | Fatourechi ........ G06F 16/2453 |
| | | 707/706 |
| 2016/0148515 A1* | 5/2016 | Augusto ............ G06F 16/9535 |
| | | 434/365 |
| 2018/0285478 A1* | 10/2018 | Wright .............. G06F 16/9024 |
| 2019/0042585 A1* | 2/2019 | Ploshykhyn ...... G06F 16/24578 |

FOREIGN PATENT DOCUMENTS

| | | |
|---|---|---|
| JP | 2005-092331 A | 4/2005 |
| JP | 2009-251707 A | 10/2009 |
| WO | WO 2017/013770 A1 | 1/2017 |

OTHER PUBLICATIONS

Office Action, dated Mar. 17, 2020, which issued during the prosecution of Japanese Patent Application No. 2018-060474, which corresponds to the present application (with English translation attached).

* cited by examiner

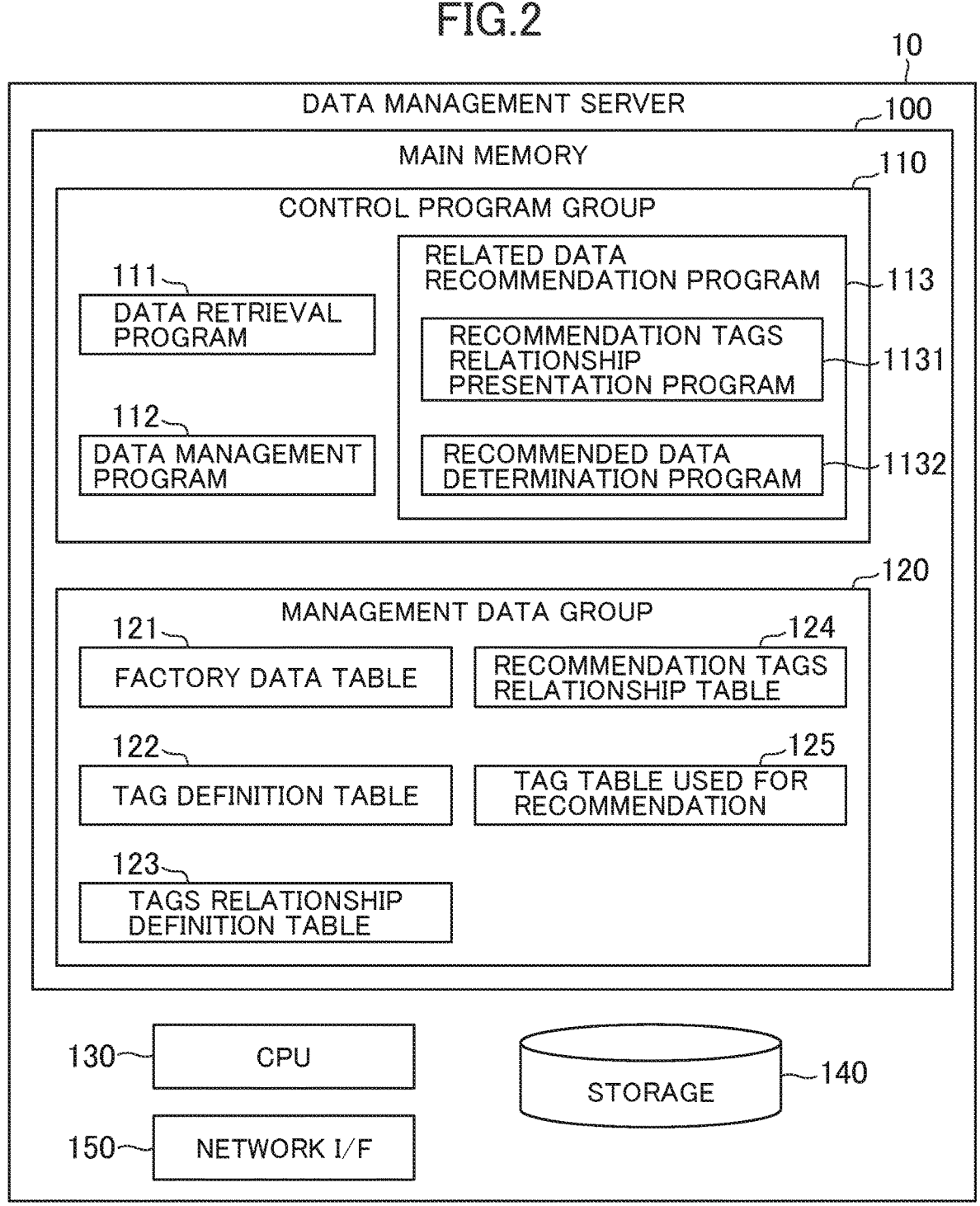

FIG.3

| RECORD NUMBER | ID | DATA NAME |
|---|---|---|
| 1 | A001 | COATING WORK WORKER INFORMATION.xlsx |
| 2 | A002 | WORKING MACHINE SENSOR SAMPLING.csv |
| 3 | A003 | BODY PANEL QUALITY INSPECTION.rdb |
| 4 | A004 | ASSEMBLING ROBOT OPERATION LOG.csv |
| ⋮ | ⋮ | ⋮ |

FACTORY DATA TABLE

FIG.4

| RECORD NUMBER | DATA NAME | TAG |
|---|---|---|
| 1 | COATING WORK WORKER INFORMATION.xlsx | DUTY INFORMATION, WORK CONTENTS, COATING PROCESS, --- |
| 2 | WORKING MACHINE SENSOR SAMPLING.csv | FACILITY SENSOR, OPERATION LOG, WORKING PROCESS,--- |
| 3 | BODY PANEL QUALITY INSPECTION.rdb | QUALITY INSPECTION, DEFECTIVE INFORMATION, PRODUCT SENSOR, --- |
| 4 | ASSEMBLING ROBOT OPERATION LOG.csv | FACILITY SENSOR, OPERATION LOG, ASSEMBLY PROCESS, --- |
| ⋮ | ⋮ | ⋮ |

TAG DEFINITION TABLE

FIG.5

| RECORD NUMBER 1230 | RELATIONSHIP NAME 1231 | KEY TAG 1232 | RELATION TAG 1233 |
|---|---|---|---|
| 1 | RELATIONSHIP TO ANTERIOR PROCESS | PRESS PROCESS | — |
| 2 | | COATING PROCESS | PRESS PROCESS |
| 3 | | ASSEMBLY PROCESS | PRESS PROCESS, COATING PROCESS |
| 4 | | WORKING PROCESS | PRESS PROCESS, COATING PROCESS, ASSEMBLY PROCESS |
| ... | | ... | ... |
| 10 | RELATIONSHIP TO MASTER DATA | FACILITY CHECK RECORD, OPERATION LOG, FACILITY SENSOR, — | FACILITY MASTER DATA |
| 11 | | STAFF INFORMATION, DUTY INFORMATION, WORK CONTENTS, — | PERSONNEL MASTER DATA |
| 12 | | PRODUCTION PLANNING, PRODUCTION PROCEDURE, DESIGN SPECIFICATION, — | PRODUCTION METHOD MASTER DATA |
| ... | | ... | ... |

TAGS RELATIONSHIP DEFINITION TABLE 123

FIG.6

| 1240 | 1241 | 1242 | 1243 | 124 |
|---|---|---|---|---|
| RECORD NUMBER | RELATIONSHIP NAME | KEY TAG | RELATION TAG | |
| 1 | RELATIONSHIP TO ANTERIOR PROCESS | WORKING PROCESS | PRESS PROCESS, COATING PROCESS, ASSEMBLY PROCESS | |
| 2 | RELATIONSHIP TO MASTER DATA | FACILITY CHECK RECORD, OPERATION LOG, FACILITY SENSOR, --- | FACILITY MASTER DATA | |
| ⋮ | ⋮ | ⋮ | ⋮ | |

RECOMMENDATION TAGS RELATIONSHIP TABLE

FIG.7

| 1251 | 1252 | 1253 | 1254 | 125 |
|---|---|---|---|---|
| RELATIONSHIP NAME | KEY TAG | RELATION TAG | ACQUIRED DATA TAG | |
| RELATIONSHIP TO ANTERIOR PROCESS | WORKING PROCESS | PRESS PROCESS, COATING PROCESS, ASSEMBLY PROCESS | FACILITY SENSOR, OPERATION LOG, WORKING PROCESS,--- | |

TAG TABLE USED FOR RECOMMENDATION

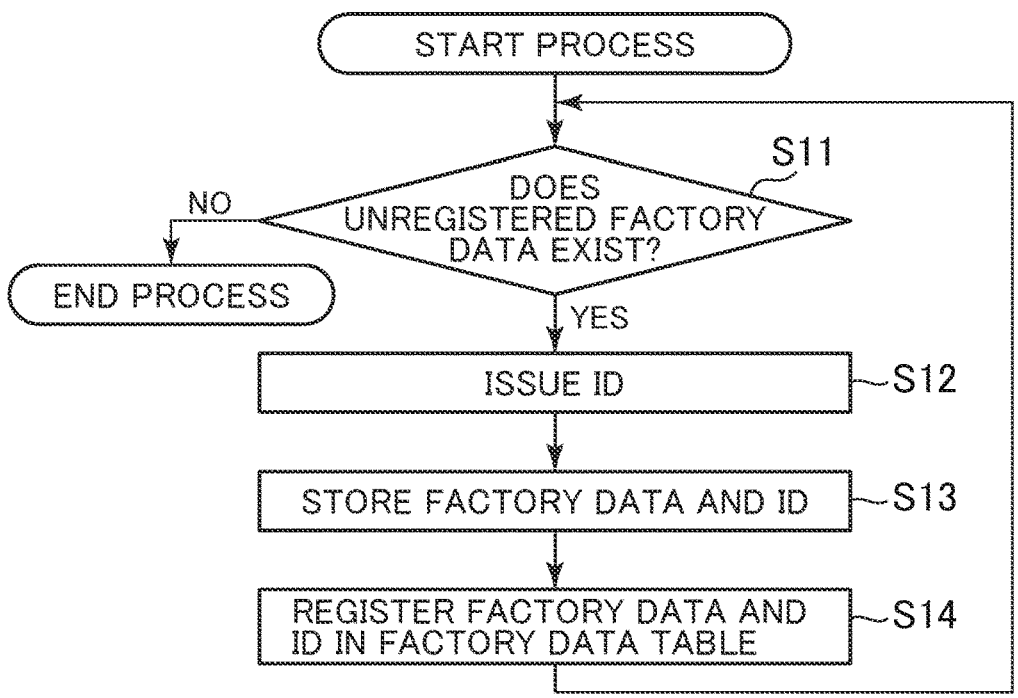
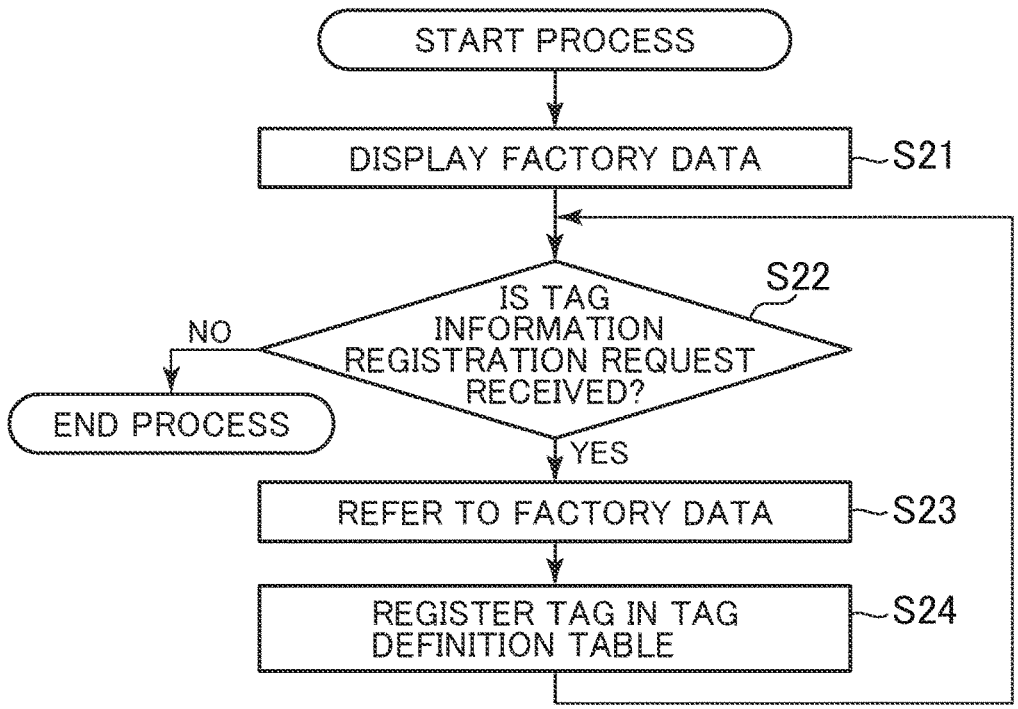

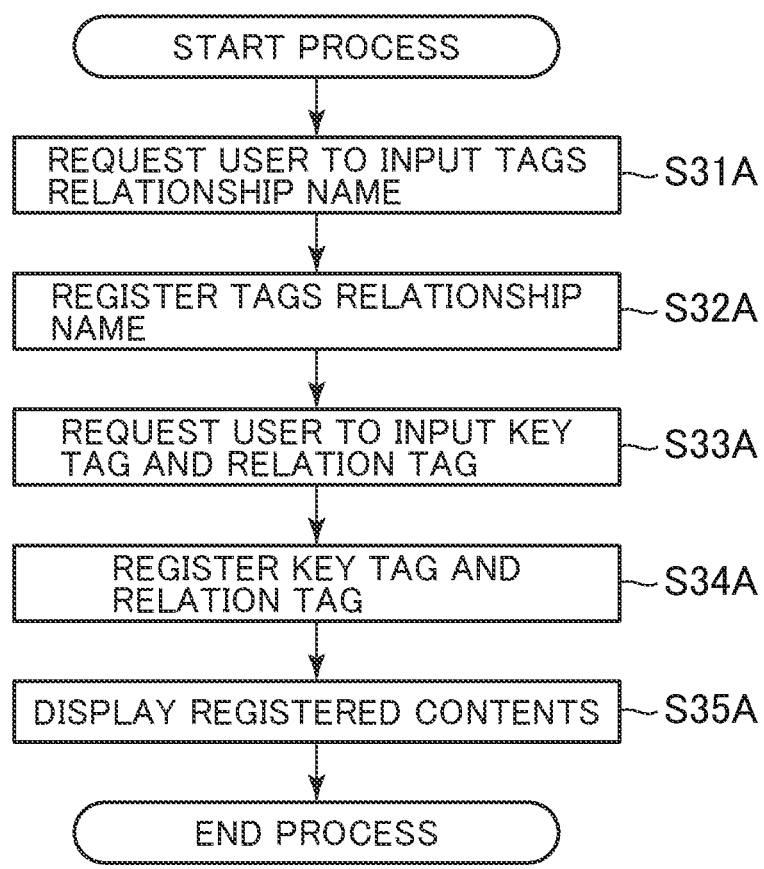

FIG.19

TAGS RELATIONSHIP DEFINITION TABLE

| RECORD NUMBER | RELATIONSHIP NAME | KEY TAG | RELATION TAG | RELATIONSHIP DEGREE |
|---|---|---|---|---|
| 1 | RELATIONSHIP TO ANTERIOR PROCESS | PRESS PROCESS | – | – |
| 2 | | COATING PROCESS | PRESS PROCESS | 1.0 |
| 3 | | ASSEMBLY PROCESS | PRESS PROCESS, COATING PROCESS | 0.8, 1.0 |
| 4 | | WORKING PROCESS | PRESS PROCESS, COATING PROCESS, ASSEMBLY PROCESS | 0.6, 0.8, 1.0 |
| ... | ... | ... | ... | ... |

FIG.20

USER BELONGING WEIGHT DEFINITION TABLE (126R)

| RECORD NUMBER (126R0) | BELONGING DEPARTMENT (126R1) | RELATION TAG (126R2) |
|---|---|---|
| 1 | GENERAL AFFAIRS D. | WORKER LIST, DUTY INFORMATION, --- |
| 2 | PRODUCTION PLANNING D. | PRODUCTION PLANNING, PRODUCTION PROCEDURE, DESIGN SPECIFICATION, --- |
| 3 | QUALITY CONTROL D. | QUALITY INSPECTION, DEFECTIVE INFORMATION, --- |
| 4 | MAINTENANCE MANAGEMENT D. | FACILITY CHECK RECORD, OPERATION LOG, --- |
| ⋮ | ⋮ | ⋮ |

FIG.21

USER RETRIEVAL HISTORY HOLDING TABLE (127R)

| RECORD NUMBER (127R0) | ACQUIRED DATA (127R1) | TAG (127R2) |
|---|---|---|
| 1 | WORKING MACHINE SENSOR SAMPLING.csv | FACILITY SENSOR, OPERATION LOG, WORKING PROCESS,--- |
| 2 | ASSEMBLING ROBOT OPERATION LOG.csv | FACILITY SENSOR, OPERATION LOG, WORKING PROCESS,--- |
| 3 | ASSEMBLING ROBOT ERROR LOG.rdb | ERROR INFORMATION, OPERATION LOG, ASSEMBLY PROCESS, --- |
| ⋮ | ⋮ | ⋮ |

DATA MANAGEMENT SYSTEM AND RELATED DATA RECOMMENDATION METHOD

CLAIM OF PRIORITY

The present application claims priority from Japanese patent application JP 2018-060474 filed on Mar. 27, 2018, the content of which is hereby incorporated by reference into this application.

BACKGROUND

The present invention relates to a data management system and a related data recommendation method.

In a data lake, structure data and unstructured data in the form of raw data in a generated state are stored in a database without determining a schema and the like, and if necessary, required data processing and analysis are made. As a schema according to a purpose of analysis and the like are not required to be determined in the data lake when data is stored, the data lake has a merit of requiring no time for configuring a schema and the like when data is stored. However, as in the data lake, a large quantity of raw data is stored in an undisposed state, the data lake has a problem that a name, a type and the like, and a stored location of data are unknown and that target data cannot be found.

For related art for retrieving target data out of a large quantity of data, technique for retrieving target data by narrowing using a tag applied to data can be given. For example, in a sales site for performing electronic commercial transactions on the Web, various tags are applied to sales merchandise, a user freely selects a tag displayed together with information of a commodity, and the user can narrow and search the commodity. WO 2017/13770 discloses a retrieval device that generates and presents a list page including a condition object used for a retrieval condition and showing the retrieval condition and a narrowing object for narrowing merchandise by tags in a tag group selected because the tag group meets a predetermined majority condition except the tag group to which the tag used for the retrieve condition belongs.

SUMMARY

However, in a manufacturing industry for example, in detection of a defective product and in specifying a cause of failure in facilities, a data searcher analyzes, searching plural data pieces which are liable to be related to a certain event in a data lake. In such a situation, when the abovementioned technique is applied to a data search in the data lake, the searcher is required to search plural times, selecting a tag in various different tag groups. Especially, when it is unknown by analysis of which data a desired result is acquired, suitable timing for acquiring desired data cannot be necessarily selected and precision of the search is deteriorated. Therefore, the searcher is required to search data, repeating a trial and an error and more time is required for a search.

One representative example of the present invention disclosed in this application is as follows. That is, the one representative example means a data management system, the data management system is configured by a computer provided with an arithmetic unit that executes predetermined processing and a storage connected to the arithmetic unit, and the data management system is provided with a presentation unit that presents relationship between tags to a user and accepts selection of the relationship between tags and a determination unit that determines related data to be recommended on the basis of tags applied to data acquired in retrieval, referring to the selected relationship between tags.

According to one embodiment of the present invention, related data can be acquired in short time. Problems, configurations and effects except the abovementioned will be clarified by description of the following embodiments.

BRIEF DESCRIPTION OF THE DRAWINGS

FIG. 2 shows a detailed configuration of a data management server in the first embodiment;

FIG. 3 shows a configurational example of a factory data table in the first embodiment;

FIG. 4 shows a configurational example of a tag definition table in the first embodiment;

FIG. 5 shows a configurational example of a tags relationship definition table in the first embodiment;

FIG. 6 shows a configurational example of a recommendation tags relationship table in the first embodiment;

FIG. 7 shows a configurational example of a tag table used for recommendation in the first embodiment;

FIG. 8 is a flowchart showing a process for registering factory data in the first embodiment;

FIG. 9 is a flowchart showing a process for registering tag information in the factory data in the first embodiment;

FIG. 10 is a flowchart showing a process for newly registering relationship between tags in the first embodiment;

FIG. 19 shows a configurational example of a tags relationship definition table to which weight information is applied in the second embodiment;

FIG. 20 shows a configurational example of a user belonging weight definition table in the second embodiment;

FIG. 21 shows a configurational example of a user search history holding table in the second embodiment.

DETAILED DESCRIPTION

First Embodiment

Figure 1:
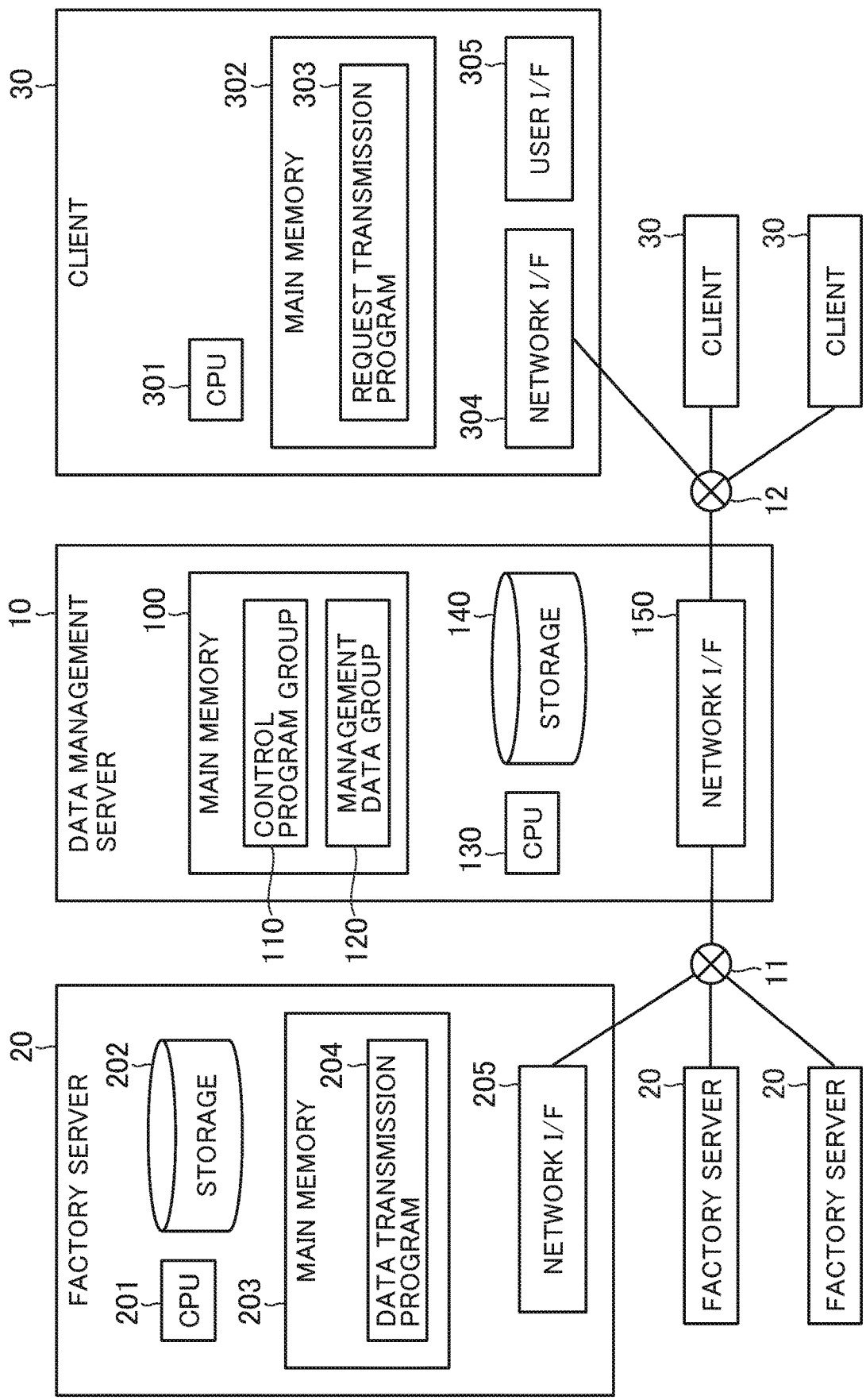
FIG. 1 shows a configurational example of a computer system equivalent to a first embodiment.

FIG. 1 shows a configurational example of a computer system equivalent to a first embodiment.

The computer system equivalent to the first embodiment is configured by a data management server 10, plural factory servers 20 and plural clients 30.

The data management server 10 and the plural factory servers 20 are connected via a wide area network (WAN) 11, and the data management server 10 and the plural clients 30 are connected via WAN 12. However, connection of the data management server 10 and the plural factory servers 20 and connection of the data management server 10 and the plural clients 30 are not via the WAN but may also be via a local area network (LAN) or another network.

The data management server 10 provides a storage function for collectively storing data transmitted from each factory and a program that retrieves data according to a request from the client 30. The data management server 10 includes a main memory 100, CPU 130 that executes programs, a storage 140 and a network interface (I/F) 150. The main memory 100 stores a control program group 110 that provides a function for processing a request received from the client 30 via the network I/F 150 and transmitting a result of the processing to the client 30 and a management data group 120. The storage 140 stores factory data transmitted from each factory server 20 and received via the network I/F 150. The factory data includes information related to workers working in the factory, manufacturing facilities and products and includes structure data such as data in RDB, semi-structured data such as CSV and XML, unstructured data such as an image and voice and the like. Details of the data management server 10 will be described referring to FIG. 2 below.

The data management server 10 is a computer system physically configured by one computer or logically or physically configured by plural computers, and may also be operated in a virtual machine configured in resources of plural physical computers.

The factory server 20 includes CPU 201 that executes a program, a storage 202, a main memory 203 that stores codes executed by the CPU 201 and data used in executing a program and network I/F 205. The main memory 203 stores a data transmission program 204. The data transmission program 204 transmits factory data stored in the storage 202 to the data management server 10 via the network I/F 205.

The factory server 20 is a computer system physically configured by one computer or logically or physically configured by plural computers and may also be operated in a virtual machine configured in resources of plural physical computers.

The client 30 includes CPU 301 that executes a program, a main memory 302 that stores codes executed by the CPU 301 and data used in executing a program, a network I/F 304 and a user interface (I/F) 305. The main memory 302 stores a request transmission program 303. The request transmission program 303 transmits a retrieval request, a tag application request and the like respectively by a user to the data management server 10 via the network I/F 304.

FIG. 2 shows a detailed configuration of the data management server 10.

The data management server 10 is provided with the main memory 100, the CPU 130, the storage 140 and the network I/F 150.

The main memory 100 includes ROM being a nonvolatile memory element and RAM being a volatile memory element. The ROM stores unchanged programs such as BIOS and the like. The RAM is a high-speed volatile memory element such as a dynamic random access memory (DRAM) and temporarily stores a program executed by the CPU 130 and data used in executing the program. The RAM stores codes executed by the CPU 130 and data used in executing the program. Specifically, the main memory 100 stores the control program group 110 and the management data group 120. The control program group 110 includes a data retrieval program 111, a data management program 112, and a related data recommendation program 113. The data retrieval program 111 provides a function for retrieving data on the basis of a request of the client 30. The data management program 112 provides a function for managing information used when data is recommended (see FIGS. 8, 9, 10, 11). The related data recommendation program 113 provides a function for recommending data on the basis of the request of the client 30 (see FIG. 12). The related data recommendation program 113 includes a recommendation tags relationship presentation program 1131 and a recommended data determination program 1132. The recommendation tags relationship presentation program 1131 narrows tags relationship information presented to a user and presents the narrowed tags relationship information (see FIG. 13). The recommended data determination program 1132 recommends related data using retrieved acquired data and selected tags relationship information (see FIGS. 14, 15).

The all or some of processing which the data management server 10 performs by executing a program may also be executed by hardware such as FPGA.

The management data group 120 includes a factory data table 121, a tag definition table 122, a tags relationship definition table 123, a recommendation tags relationship table 124, and a tag table 125 used for recommendation.

The factory data table 121 is a table recording factory data transmitted from each factory server 20, after the factory data is stored in the storage 140, it is read from the storage 140 according to search action by a user, and the factory data is stored in the main memory 100. Details of the factory data table 121 will be described referring to FIG. 3 below.

The tag definition table 122 is a table recording tag information applied every data piece stored in the data lake and is used for managing tag information transmitted from the client 30. Tag definition information is suitably stored in the storage 140. In this case, a tag denotes a characteristic and contents of each data piece, names of a process and a line for acquiring data and the like. Details of the tag definition table 122 will be described referring to FIG. 4 below.

The tags relationship definition table 123 is a table recording tags showing order, classification, inclusion relation and the like and relationship information between the tags, and tags relationship information transmitted from the client 30 is managed in the table. The tags relationship information is suitably stored in the storage 140. Details of the tags relationship definition table 123 will be described referring to FIG. 5 below.

The recommendation tags relationship table 124 includes data generated in retrieval by the related data recommendation program 113 and some of information in the tags relationship definition table 123 is stored in the table. Details of the recommendation tags relationship table 124 will be described referring to FIG. 6 below.

The tag table 125 used for recommendation includes data generated in retrieval by the related data recommendation program 113 and a part of information in the tag definition table 122 and the recommendation tags relationship table 124 is stored in the table. Details of the tag table 125 used for recommendation will be described referring to FIG. 7 below. These control programs are executed using the management data by the CPU 130.

The storage 140 is a mass nonvolatile storage such as a magnetic storage (HDD) and a flash memory (SSD). The storage 140 stores data accessed in executing a program. In addition, the storage 140 may also store a program executed by a processor. In this case, the program is read from the storage 140 and loaded onto the main memory 100, and the program is executed by the processor.

A program executed by the CPU 130 is provided to the data management server 10 via removable media such as CD-ROM and a flash memory or a network and is stored in the nonvolatile storage being an untemporary storage medium. Therefore, the data management server 10 may be provided with an interface for reading data from such removable media.

FIG. 3 shows a configurational example of the factory data table 121 in the first embodiment.

The factory data table 121 is a list of factory data and includes fields of a record number 1210, ID 1211, and a data name 1212. The record number 1210 is a number for specifying a record. The ID 1211 is identification information for uniquely specifying factory data transmitted from each factory and the data name 1212 is a data name such as a file name of the factory data. For example, the data name 1212 equivalent to A001 in the field of the ID 1211 is "coating work worker information.xlsx" and the data name 1212 equivalent to A002 in the field of the ID 1211 is "working machine sensor sampling.csv".

FIG. 4 shows a configurational example of the tag definition table 122 in the first embodiment.

The tag definition table 122 includes information containing definition of a tag applied to data in a factory and each data piece, and includes fields of a record number 1220, a data name 1221, and a tag 1222. The record number 1220 is a number for specifying a record. The data name 1221 is equivalent to the data name of the factory data registered in the field of the data name 1212 in the factory data table 121. In the field of the data name 1221, identification information for identifying data may also be recorded in place of the data name. The field of the tag 1222 is a list of tags applied to each data piece. The tag shows information such as a characteristic and contents of data and a process related to the data, and zero or more tags are applied to one data piece. For an example in a manufacturing industry, "duty information", "work contents", "coating process" and the like as the tag 1222 are applied to data having "coating work worker information.xlsx" as the data name 1221, and "facility sensor", "operation log", "working process" and the like as the tag 1222 are applied to data having "working machine sensor sampling.csv" as the data name 1221.

FIG. 5 shows a configurational configuration of the tags relationship definition table 123 in the first embodiment.

Definitions of relationship between tags are recorded in the tags relationship definition table 123. The relationship between tags means relationship between tags in ordering, classification, inclusion, correspondence relation and the like. The tags relationship definition table 123 includes fields of a record number 1230, a relationship name 1231, a key tag 1232 and a relation tag 1233.

The record number 1230 is a number for specifying a record. The relationship name 1231 is a name of relationship between tags and a generally recognizable name is applied. The key tag 1232 is one or more tags in certain relationship between tags. The relation tag 1233 is a tag corresponding to certain relationship in the key tag 1232. For an example of relationship in the manufacturing industry, "relationship to anterior process" and "relationship to master data" are shown in FIG. 5. As for "relationship to anterior process", in relation to a tag denoting a process name such as "press process", "coating process", "assembly process" and "working process", relation in order between a certain process and its anterior process is defined. For example, assuming that processes continue in such order as a first press process, a second coating process, and a third assembly process, as an anterior process of the coating process is the press process for relationship between tags, the press process is defined in the field of the relation tag 1233 corresponding to the coating process in the field of the key tag 1232 as shown in a second record in the tags relationship definition table 123. In addition, as an anterior process of the assembly process is the press process and the coating process, the press process and the coating process are defined in the field of the relation tag 1233 corresponding to the assembly process in the field of the key tag 1232 as shown in a third record in the tags relationship definition table 123. As described above, plural relation tags 1233 may also be defined corresponding to the certain key tag 1232. Moreover, as shown in the first record in the tags relationship definition table 123, no relation tag 1233 corresponding to the certain key tag 1232 may be defined.

Additionally, in a field of "relationship to master data", relationship between various tags and tags related to master data is defined. As shown in a tenth record in the tags relationship definition table 123, a "facility master data" tag is defined as the corresponding relation tag 1233 for the key tag 1232 related to facilities such as "facility check record", "operation log", and "facility sensor". Further, as shown in an eleventh record in the tags relationship definition table 123, a "personnel master data" tag is defined in the corresponding relation tag 1233 for the key tag 1232 related to staffs such as "staff information", "duty information", and "work contents". As the key tag 1232, plural tags may also be defined. Furthermore, one type of tag belongs to plural relationships and may also be defined in plural key tags 1232 and plural relation tags 1233. Furthermore, for another example of relationship between tags, relationship to a posterior process in which ordering of the posterior process for a certain process is defined, relationship between a room and a process in which relationship between a tag representing the room for work and a tag representing a process name is defined and "relationship to 4M." in which classification between tags in 4M denoting "a machine, material, a man and a method" regarded as important in the manufacturing industry is defined can be given. Furthermore, for relationship between tags, things except the abovementioned may also be used.

FIG. 6 shows a configurational example of the recommendation tags relationship table 124 in the first embodiment.

In the recommendation tags relationship table 124, tags relationship information presented to a user is defined. The recommendation tags relationship table 124 is acquired by extracting a part of the tags relationship definition table 123 shown in FIG. 5 and includes fields of a record number 1240, a relationship name 1241, a key tag 1242 and a relation tag 1243.

FIG. 7 shows a configurational example of the tag table 125 used for recommendation in the first embodiment.

The tag table 125 used for recommendation records information of tags used for recommendation and includes fields of a relationship name 1251, a key tag 1252, a relation tag 1253 and an acquired data tag 1254. The relationship name 1251, the key tag 1252 and the relation tag 1253 in the tag table 125 used for recommendation are the same as the relationship name 1241, the key tag 1242 and the relation tag 1243 in the recommendation tags relationship table 124 shown in FIG. 6. In the field of the acquired data tag 1254, tags applied to a tag acquired in a search by a used are recorded.

FIG. 8 is a flowchart showing a process for registering factory data in the first embodiment.

First, it is determined whether factory data received via the network I/F 150 is registered in the storage 140 or not (a step S11). When new factory data unregistered in the storage 140 is received, the data management program 112 issues ID to the received factory data (a step S12). The received new factory data and the ID issued in the step S12 are stored in the storage 140 (a step S13). Further, the ID and a factory data name are registered in the factory data table 121 (a step S14) and the process is returned to the step S11.

FIG. 9 is a flowchart showing a process for registering tag information in the first embodiment.

First, the data management program 112 transmits factory data to be displayed on the client 30 via the network I/F 150 (a step S21). When a tag information registration request is received from the client 30 via the network I/F 150 (a step S22), the data management program 112 retrieves the factory data table 121 and refers to factory data requested in the tag information registration request (a step S23). Further, a factory data name of the factory data referred to in the step S22 and a tag input by a user via the client 30 are registered in the tag definition table 122 (a step S24) and the process is returned to the step S22.

FIG. 10 is a flowchart showing a process for newly registering relationship between tags in the first embodiment.

First, when a tags relationship information registration request is received from the client 30 via the network I/F 150 and a tags relationship name is input by a user (a step S31A), the data management program 112 registers the tags relationship name input in the step S31A in the tags relationship definition table 123 (a step S32A). Next, information of a key tag and a relation tag is input from the client 30 via the network I/F 150 and when a registration request is received (a step S33A), the data management program 112 registers the key tag and the relation tag respectively input in the step S33A in the tags relationship definition table 123 (a step S34A) and instructs to display registered contents (a step S35A).

Figure 11:
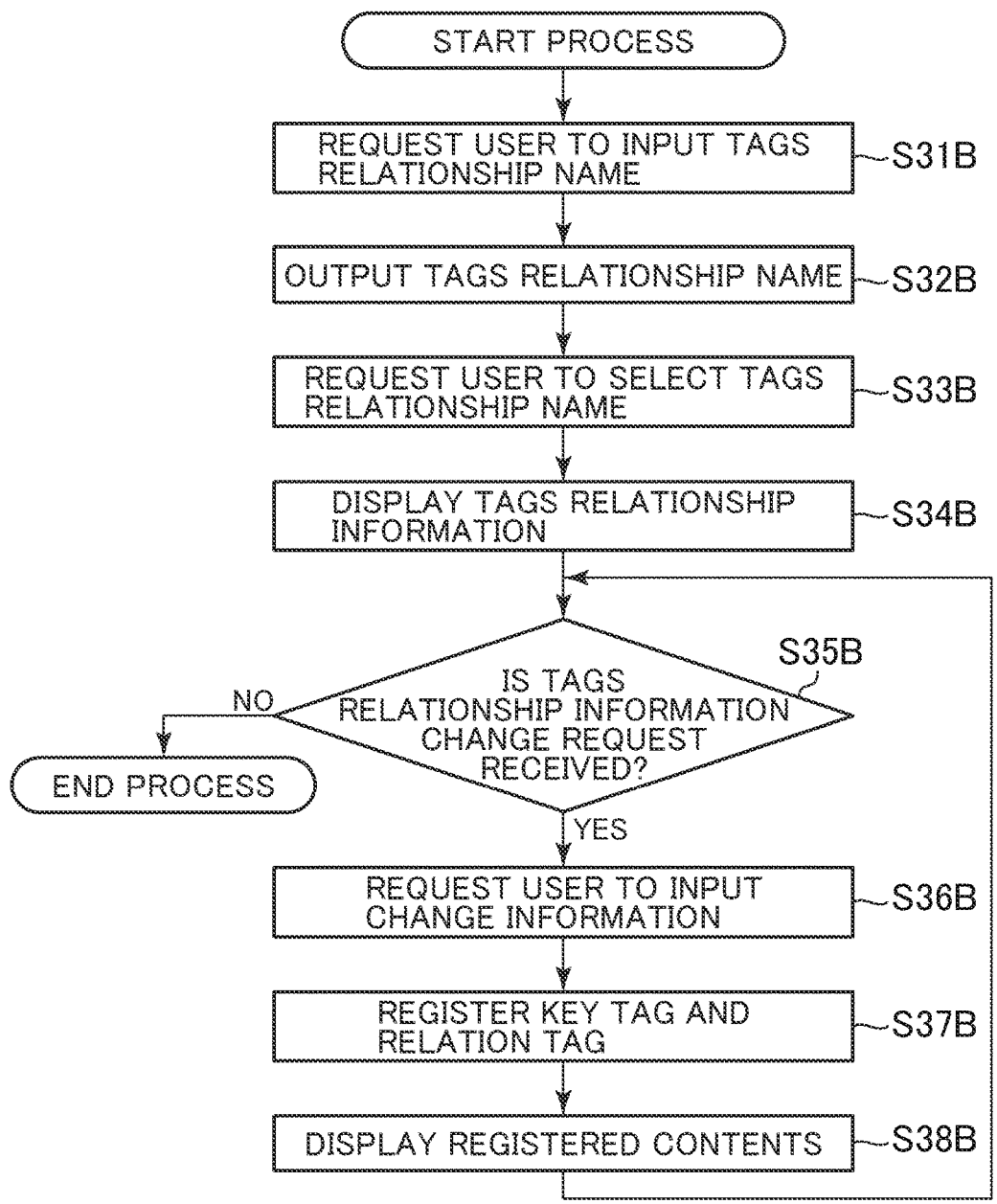
FIG. 11 is a flowchart showing a process for displaying and changing the relationship between tags in the first embodiment.

FIG. 11 is a flowchart showing a process for displaying and changing the tags relationship definition table 123 in the first embodiment.

First, when a tags relationship name is input from the client 30 via the network I/F 150 (a step S31B), the data management program 112 retrieves the tags relationship definition table 123, acquires tags relationship names which are coincident with the input tags relationship name, and outputs the acquired tags relationship names (a step S32B). When the tags relationship name is selected in the client 30 and the selected tags relationship name is received via the network I/F 150 (a step S33B), the data management program 112 retrieves the selected tags relationship name from the tags relationship definition table 123 and instructs to display the corresponding key tag 1232 and the corresponding relation tag 1233 (a step S34B).

Afterward, it is determined whether a tags relationship information change request is received from the client 30 or not (a step S35B). When a tags relationship information change request is received from the client 30 (a step S35B), the data management program accepts input of change information from a user (a step S36B). When a change information registration request is received from the client 30, the data management program registers a changed key tag 1232 and a changed relation tag 1233 in the tags relationship definition table 123 (a step S37B). The data management program instructs to display contents registered in the step S37B (a step S38B) and the process is returned to the step S35B.

In the step S35B, when no tags relationship information request is received, the process is finished.

Figure 12:
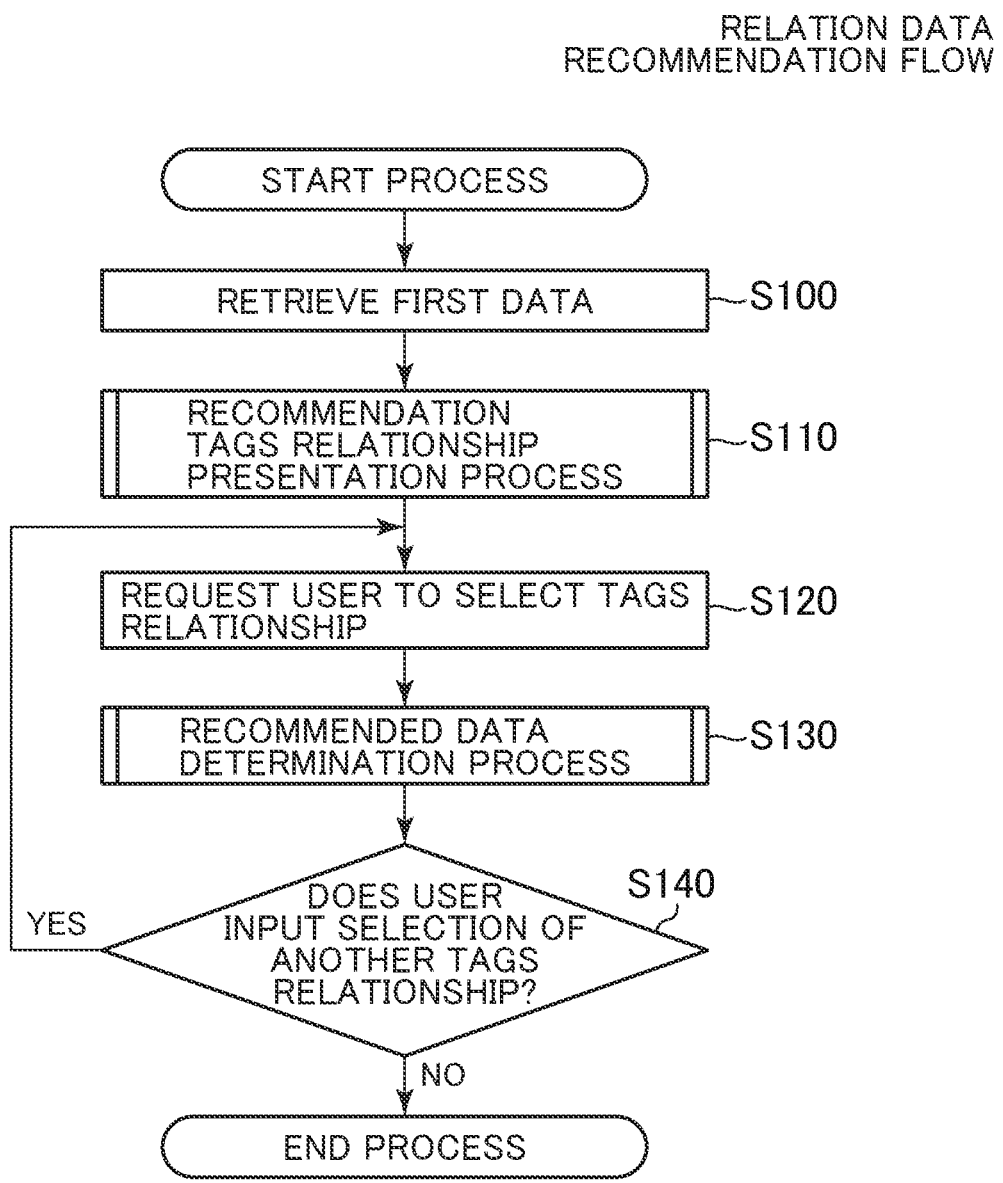
FIG. 12 is a flowchart showing a process for recommending related data in the first embodiment.

FIG. 12 is a flowchart showing a process for recommending related data in the first embodiment.

First, the client 30 transmits a request for retrieving first data (acquired data) to the data management server 10 via the network I/F 150. The data retrieval program 111 retrieves data according to the received retrieval request (a step S100). For the retrieval in the step S100, various methods such as tag retrieval being the previous method and full-text retrieval being retrieval including contents of data may also be used and information such as the tag defined in FIG. 4 may also be used for retrieval.

Next, the related data recommendation program 113 (the recommendation tags relationship presentation program 1131) narrows tags relationship information presented to a user by executing a recommendation tags relationship presentation process (see FIG. 13) using information of the acquired data retrieved in the step S100, and presents the narrowed tags relationship information (a step S110). The user selects tags relationship information used for recommendation in the presented tags relationship information, the recommendation tags relationship presentation program 1131 accepts selection by the user, and the recommendation tags relationship presentation program holds the selected tags relationship information (a step S120). Tags relationship information may also be selected according to a predetermined rule without requesting the user to select tags relationship information. In addition, a rule for selecting tags relationship information may also be selected. The related data recommendation program 113 (the recommended data determination program 1132) recommends related data using the acquired data retrieved in the step S100 and the tags relationship information selected in the step S120 by executing a recommended data determination process (see FIG. 14) (a step S130). Moreover, when the user inputs another relationship between tags, the process is returned to the step S120 (a step S140).

Figure 13:
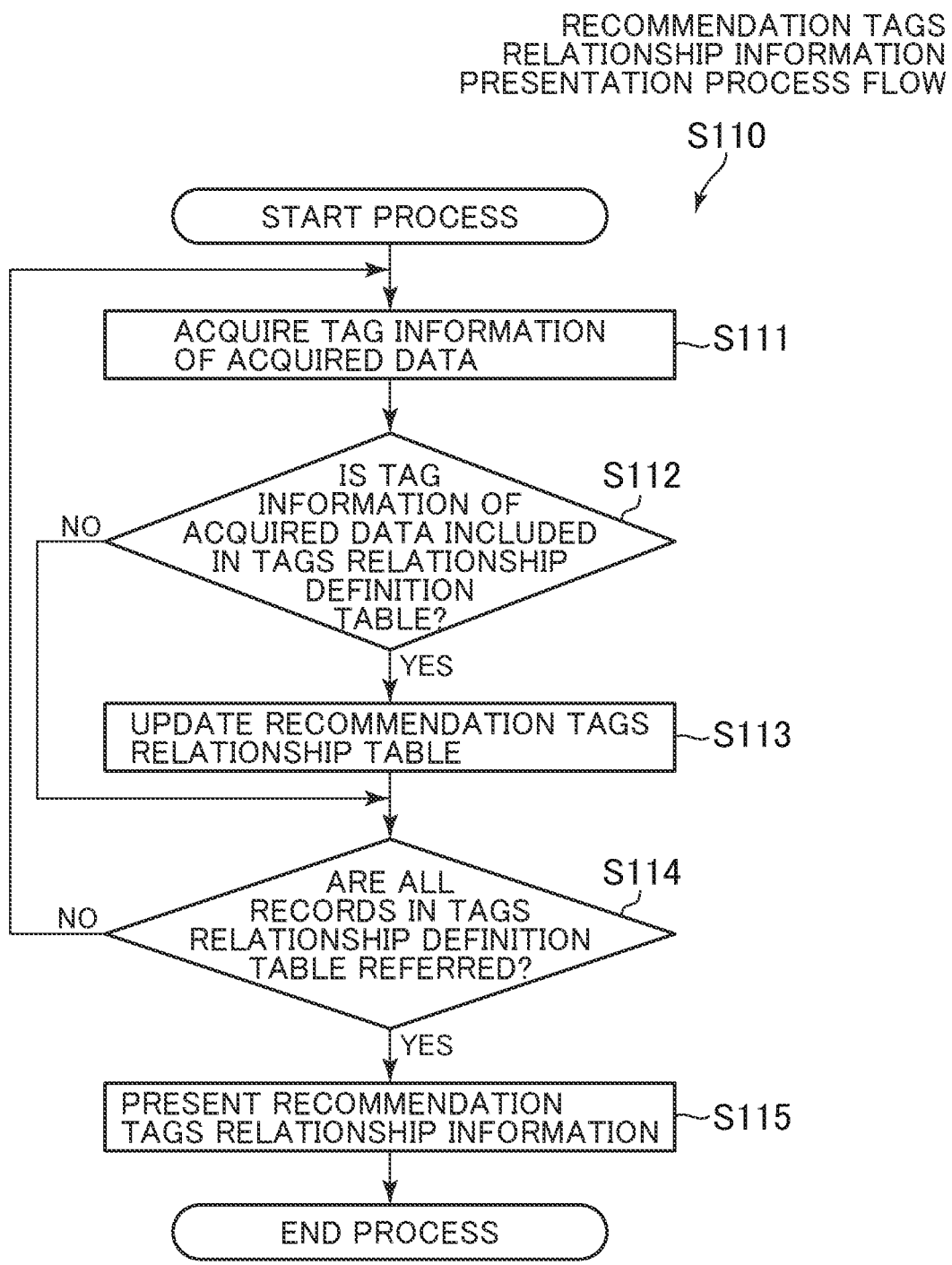
FIG. 13 is a flowchart showing details of a tags relationship presentation process in a step S110 in the related data recommendation process shown in FIG. 12.

FIG. 13 is a detailed flowchart of the recommendation tags relationship presentation process in the step S110 in the related data recommendation process shown in FIG. 12.

First, the recommendation tags relationship presentation program 1131 refers to the tag definition table 122 and acquires tag information (acquired data tag information) applied to acquired data retrieved in the step S100 in the related data recommendation flow (a step S111). Afterward, it is determined whether the acquired data tag information is included in the field of the key tag 1232 (a step S112). When the acquired data tag information is included in the field of the key tag 1232, the record in the tags relationship definition table 123 is recorded in the recommendation tags relationship table 124 (a step S113). In the meantime, when it is determined in the step S112 that the acquired data tag information is not included in the tags relationship definition table 123, the process proceeds to a step S114.

In the step S114, it is determined whether all records in the tags relationship definition table 123 are referred to (the step S114). When some of records in the tags relationship definition table 123 are not referred to, the process is returned to the step S111. In the meantime, when reference to all the records in the tags relationship definition table 123 is finished, recommendation tags relationship information is presented to a user via the network I/F 150 (a step S115). By the abovementioned processes, time in which a user selects relationship between tags can be reduced by narrowing down relationship between tags presented to the user not to all relationship between tags but to relationship between tags related to acquired data.

For example, when the user acquires "working machine sensor sampling.csv" as acquired data in the step S100, the tag definition table 122 is referred to and "facility sensor", "operation log", "working process" and the like are acquired as acquired data tag information in the step S111. It is determined referring to the records in the tags relationship definition table 123 in order whether any of "facility sensor", "operation log", and "working process" is included (a step S112). When acquired data tag information is included in the record in the tags relationship definition table 123 (the step S112), the record is recorded in the recommendation tags relationship table 124 (a step S113).

Afterward, it is determined whether all records in the tags relationship definition table 123 are referred to (a step S114). When some of records in the tags relationship definition table 123 are not referred to, the process is returned to the step S111. For example, "relationship to anterior process" in the field of the relationship name 1231 in a fourth record in the tags relationship definition table 123, "working process" in the field of the key tag 1232, "press process, coating process and assembly process" in the field of the relation tag 1233 are recorded in the recommendation tags relationship table 124, and the process is returned to the step S111.

In the meantime, when reference to all records in the tags relationship definition table 123 is finished, recommendation tags relationship information is presented to the user and the user is requested to select (a step S115).

Figure 14:
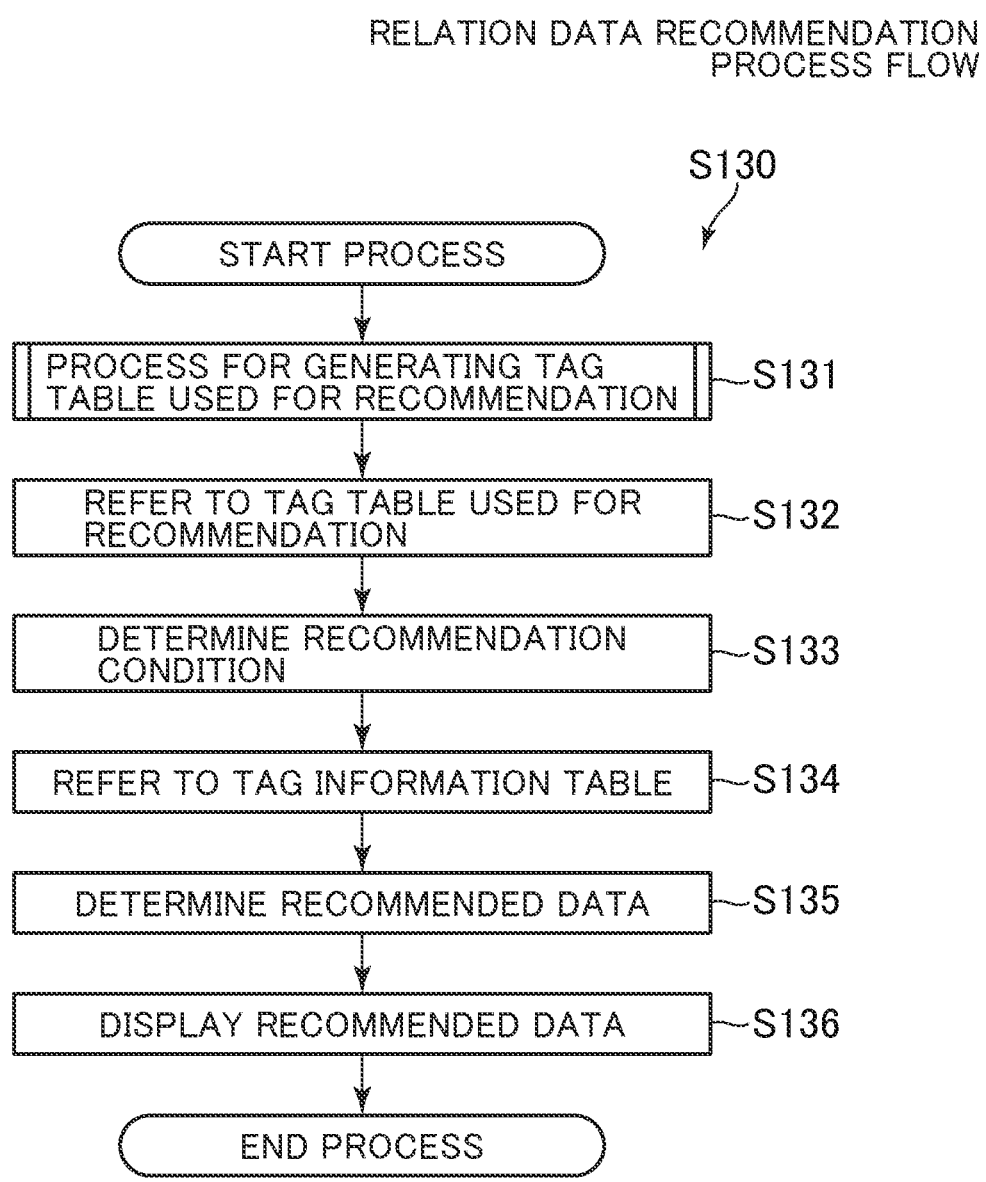
FIG. 14 is a flowchart showing details of a recommended data determination process in a step S130 in the related data recommendation process shown in FIG. 12.

FIG. 14 is a detailed flowchart showing a recommended data determination process in the step S130 for the related data recommendation process shown in FIG. 12.

First, the recommended data determination program 1132 generates the tag table 125 used for recommendation on the basis of the acquired data tag information acquired in the step S100 and the tags relationship information selected by the user in the step S120 by executing a process for generating the tag table used for recommendation (see FIG. 15) (a step S131). The recommended data determination program determines a condition of recommendation (a step S133), referring to the generated tag table 125 used for recommendation (a step S132). The recommended data determination program determines data which is coincident with the condition of recommendation determined in the step S133 (a step S135), referring to the tag definition table 122 (a step S134) and instructs to display the determined recommended data (a step S136).

Figure 15:
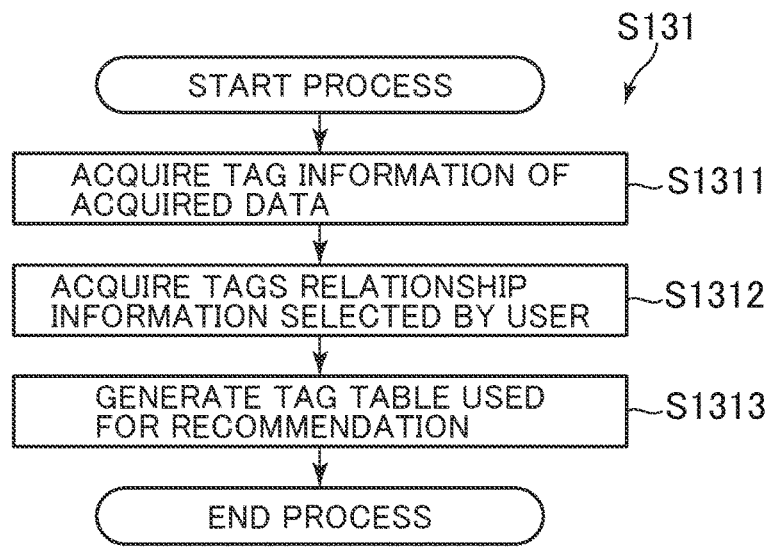
FIG. 15 is a flowchart showing details of processing for generating the tag table used for recommendation in a step S131 in the recommended data determination process shown in FIG. 14.

FIG. 15 is a detailed flowchart showing the process for generating the tag table used for recommendation in the step S131 for the recommended data determination process shown in FIG. 14.

First, the recommended data determination program 1132 acquires acquired data tag information (a step S1311), referring to the tag definition table 122 and acquires the tags relationship information selected by the user in the step S120 (a step S1312). The tag table 125 used for recommendation is generated on the basis of the acquired data tag information acquired in the step S1311 and the tags relationship information acquired in the step S1312 (a step S1313).

For example, when the user acquires "working machine sensor sampling.csv" as acquired data in the step S100 and selects "relationship to anterior process" as relationship between tags, "facility sensor", "operation log", "working process" and the like are acquired as an acquired data tag, referring to the tag definition table 122 in the step S1311. In addition, in the step S132, "working process" is acquired as a key tag of "relationship to anterior process", and "press process", "coating process", and "assembly process" are acquired as a relation tag respectively referring to the recommendation tags relationship table 124. The acquired data tag information acquired in the step S1311 and the tags relationship information selected by the user which is acquired in the step S1312 are coordinated and in the step S1313, for example, the tag table 125 used for recommendation shown in FIG. 7 and including "relationship to anterior process" in the field of the relationship name 1251, "working process" in the field of the key tag 1252, "press process, coating process, assembly process" in the field of the relation tag 1253 and "facility sensor, operation log, working process, - - - " in the field of the acquired data tag 1254 is generated.

In addition, in the process for generating the tag table used for recommendation in the step S131, after the tag table 125 used for recommendation shown in FIG. 7 for example is generated, a condition of data to be recommended (a recommendation tag) is determined in the step S133, referring to the tag table 125 used for recommendation generated in the step S131 in the step S132 (the step S133).

For an example of a method of selecting recommended data, data to which either of a relation tag or an acquired tag is applied may also be recommended. That is, when RTags1=O1∨O2∨R1∨R2 if two key tags are K1, K2, two relation tags are R1, R2 and two acquired data tags are O1, O2 in a system having the two key tags 1252, the two relation tags 1253 and the two acquired data tags 1254, data to which the RTags1 is applied is recommended as recommended data. In the example shown in FIG. 7, data to which any tag of "press process", "coating process", "working process", "facility sensor", and "operation log" is applied is recommended.

Moreover, for an example of another method of selecting recommended data, data to which any tag in the field of the relation tag and any tag in the field of the acquired data tag are applied may also be recommended. That is, when RTags2=(O1∨O2)∧(R1∨R2) in the abovementioned system, data to which the RTags2 is applied is recommended as recommended data. In the example shown in FIG. 7, data to which any of "press process", "coating process", and "working process" and any of "facility sensor", "operation log", and "working process" are applied is recommended.

Further, for an example of further another method of selecting recommended data, data to which any tag in the field of the relation tag and any tag except the key tag in the field of the acquired data tag are applied may also be recommended. That is, when RTags3=((O1∨O2)−(K1+K2))∧(R1∨R2) in the abovementioned system, data to which the RTags3 is applied is recommended as recommended data. In the example shown in FIG. 7, data to which any tag of "press process", "coating process", and "assembly process" and "facility sensor" and "operation log" are applied is recommended. The method of selecting recommended data may also be a method except the abovementioned and may also be different every selected relationship between tags.

Furthermore, a user may also be requested to select a recommendation method out of plural recommendation methods for acquiring related data.

When "working machine sensor sampling.csv" is selected as acquired data for example by the recommended data determination process shown in FIG. 14 and "relationship to the anterior process" is selected as relationship between tags, "assembling robot operation log.csv" is displayed as recommended data.

Data related to acquired data can be thoroughly acquired by the abovementioned processes, a user is not required to newly acquire data by tag narrowing retrieval, and time for retrieving plural data pieces can be reduced. In addition, as recommended data according to relationship between tags selected by the user are narrowed and the narrowed recommended data is presented to the user, displayed data can be reduced, precision for recommending data can be enhanced, and retrieval time can be reduced.

Figure 16:
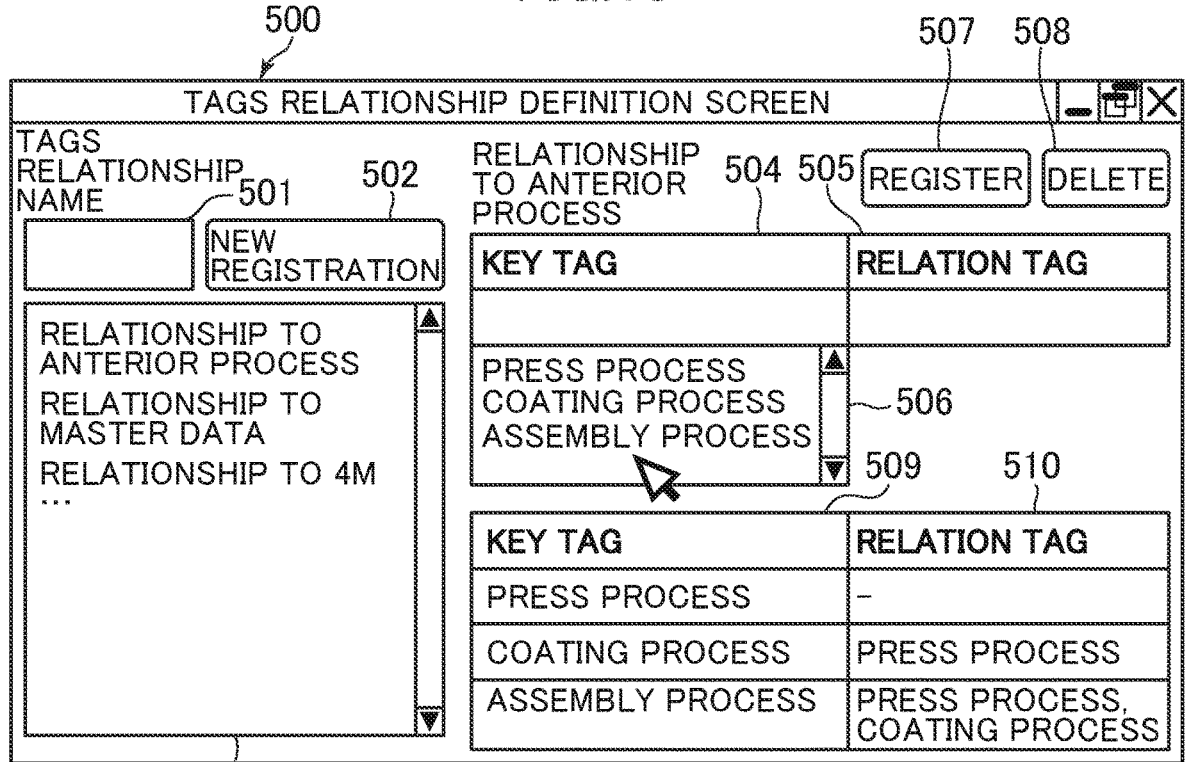
FIG. 16 shows an example of a screen for defining relationship between tags in the first embodiment.

FIG. 16 shows an example of a screen 500 defining relationship between tags in the first embodiment.

The tags relationship definition screen 500 includes a tags relationship name input field 501, a new registration button 502, a tags relationship name display field 503, a key tag input field 504, a relation tag input field 505, a tag list display field 506, a REGISTER button 507, a DELETE button 508, a key tag input situation display field 509, and a relation tag input information display field 510. The tags relationship name input field 501 is a field for inputting a name of relationship between tags. The new registration button 502 is a button operated to newly define tags relationship information. The tags relationship name display field 503 is an area for displaying a registered tags relationship name acquired as a result of retrieval. The key tag input field 504 is a field for inputting a key tag and the relation tag input field 505 is a field for inputting a relation tag. The tag list display field 506 is an area for displaying a list of tags which may be a key tag. The REGISTER button 507 is a button operated to register defined tags relationship information and the DELETE button 508 is a button operated to delete the defined tags relationship information. The key tag input situation display field 509 is an area for displaying a registered key tag and the relation tag input information display field 510 is an area for displaying a registered relation tag.

When a user newly registers relationship between tags, the user inputs a name of relationship between tags in the tags relationship name input field 501 and presses the new registration button 502 (the step S31A). The data management program 112 registers the relationship name input in the step S31A in the tags relationship definition table 123 and instructs to display the input tags relationship name in the tags relationship name display field 503 (the step S32A). When the user inputs a key tag and a relation tag and presses the REGISTER button 507 (the step S33A), the tags relationship definition table 123 is updated (the step S34A).

When a user inputs the already registered tags relationship name in the tags relationship name input field 501 (the step S31B) in a case that the already registered relationship between tags is retrieved, the data management program 112 refers to the tags relationship definition table 123 and instructs to display the input tags relationship name in the tags relationship name display field 503 (the step S32B). In addition, when the user selects a tags relationship name displayed in the tags relationship name display field 503 (the step S33B), the selected tags relationship name is retrieved from the tags relationship definition table 123, and the corresponding key tag 1232 and the corresponding relation tag 1233 are acquired from the tags relationship definition table 123. The acquired key tag 1232 is displayed in the key tag input situation display field 509 and the acquired relation tag 1233 is displayed in the relation tag input information display field 510 (the step S34B).

Moreover, to change the displayed tag input situation (the step S35B), when the user inputs changed information in the key tag input field 504 or in the relation tag input field 505 (the step S36B) and presses the REGISTER button 507, the tags relationship definition table 123 is updated (the step S37B), and a changed registration situation is displayed in the key tag input situation display field 509 or in the relation tag input information display field 510 (the step S38B).

Additionally, to delete something in the displayed tag input situation, when the user selects the key tag input situation display field 509 including a key tag to be deleted or the relation tag input information display field 510 including a relation tag to be deleted and presses the DELETE button 508, the tags relationship definition table 123 is updated.

Figure 17:
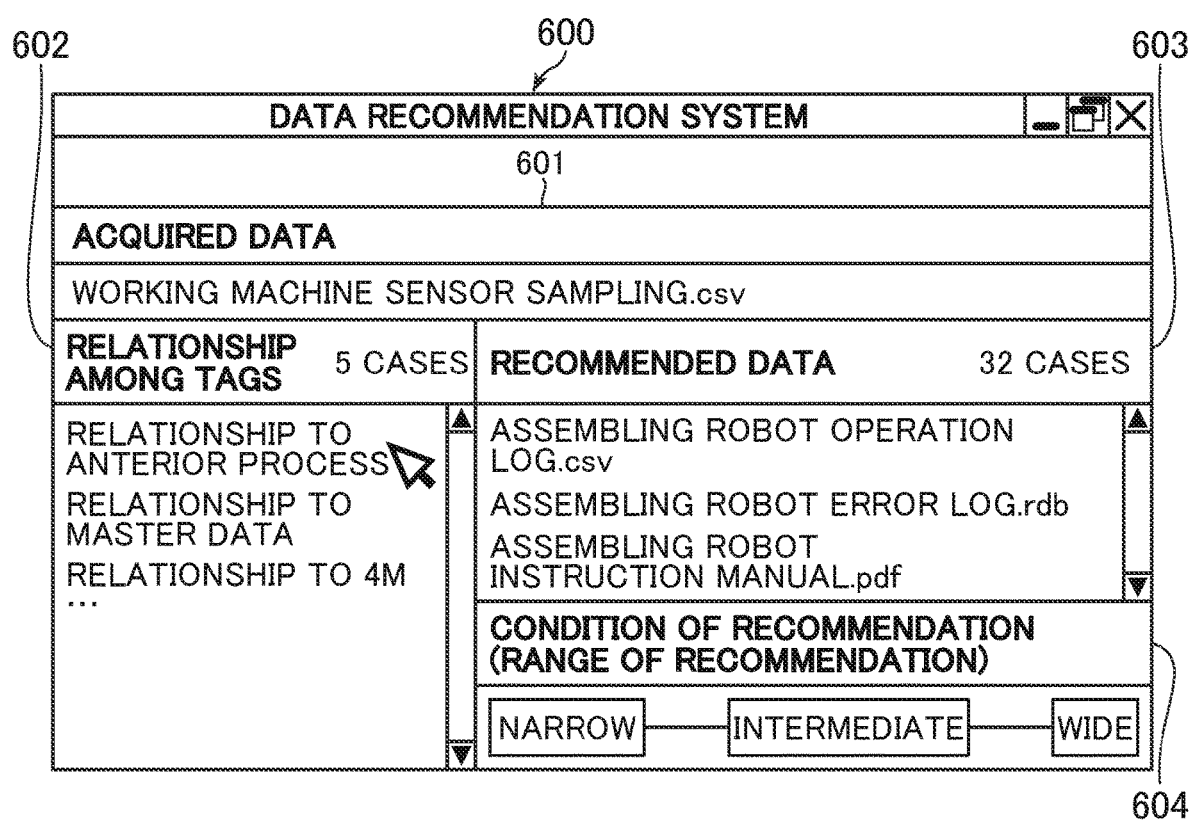
FIG. 17 shows an example of a recommendation system screen in the first embodiment.

FIG. 17 shows an example of a recommendation system screen 600 in the first embodiment.

The recommendation system screen 600 includes an acquired data display field 601, a tags relationship display field 602, a recommended data display field 603, and a recommendation condition selecting field 604.

The acquired data display field 601 is an area for displaying a data name of acquired data. The tags relationship display field 602 is an area for displaying relationship between tags which is determined in the tags relationship presentation process in the step S110 and which is to be presented to a user. The recommended data display field 603 is an area for displaying a data name recommended in the related data recommendation process in the step S130 on the basis of relationship between tags selected by the user.

The recommendation condition selecting field 604 is a field for a user to select a recommendation condition for acquiring recommended data when plural methods of calculating recommended data are used in the step S133. The recommendation condition selecting field 604 is an arbitrary configuration and is not necessarily required to be provided. The recommendation condition selecting field 604 displays relative size of a recommendation range in the plural calculation methods and a user can select suitable size. The recommendation condition selecting field 604 may also display names applied to plural methods of calculating related data so that a user can directly select a calculation method.

The example shown in FIG. 17 shows that related data is acquired on a relatively wide condition (a choice: "wide") out of three types or related data is acquired on a narrower condition (a choice: "narrow") when three types of methods of calculating recommended data having choices of "wide", "intermediate", and "narrow" are set. For example, when for a method of selecting recommended data, three types of RTags1, RTags2, and RTags3 described in relation to the step S133 are set, many related data pieces are recommended because in RTags1, retrieval is made on a loose condition that only one tag out of tags included in the relation tag field and in the acquired data field has only to be matched and a retrieval result in a wider range can be acquired. In the meantime, as to RTags3, as retrieval is made on a strict condition that a relation tag and an acquired data tag are combined on a predetermined condition, recorded related data is narrowed down and a retrieval result in a narrower range is acquired. That is, RTags1 is defined as "wide", RTags2 is defined as "intermediate", and RTags3 is defined as "narrow". Even a user who is not well informed about a selecting condition can suitably select a condition by expressing choices in generally understandable representation as described above.

For example, in FIG. 17, when a user selects "working machine sensor sampling.csv" in the step S100 as acquired data, "relationship to anterior process", "relationship to master data", "relationship to 4M" and the like are displayed in the tags relationship display field 602 as tags relationship information determined in the recommendation tags relationship presentation process in the step S110. When the user selects "relationship to anterior process" in the step S120, a tag table 125 used for recommendation is generated in the step S131. Further, when the user selects "intermediate" as a recommendation range (a recommendation condition) in the recommendation condition selecting field 604 and the recommendation condition is determined in the step S133, the tag information table is referred to in the step S134, data matched with the recommendation condition are retrieved, and recommended data is determined in the step S135. For data determined in the step S136, "assembling robot operation log.csv", "assembling robot error log.rdb" and "assembling robot instruction manual.pdf" are displayed in the recommended data display field 603.

Second Embodiment

A second embodiment will be described mainly in relation to difference with the first embodiment below. In the first embodiment, data related to acquired data is recommended using the tags relationship information. In the second embodiment, a function for ranking recommended data is provided. In the second embodiment, the same reference numeral is allocated to the same configuration and the same function as those in the first embodiment and description of them is omitted.

Figure 18:
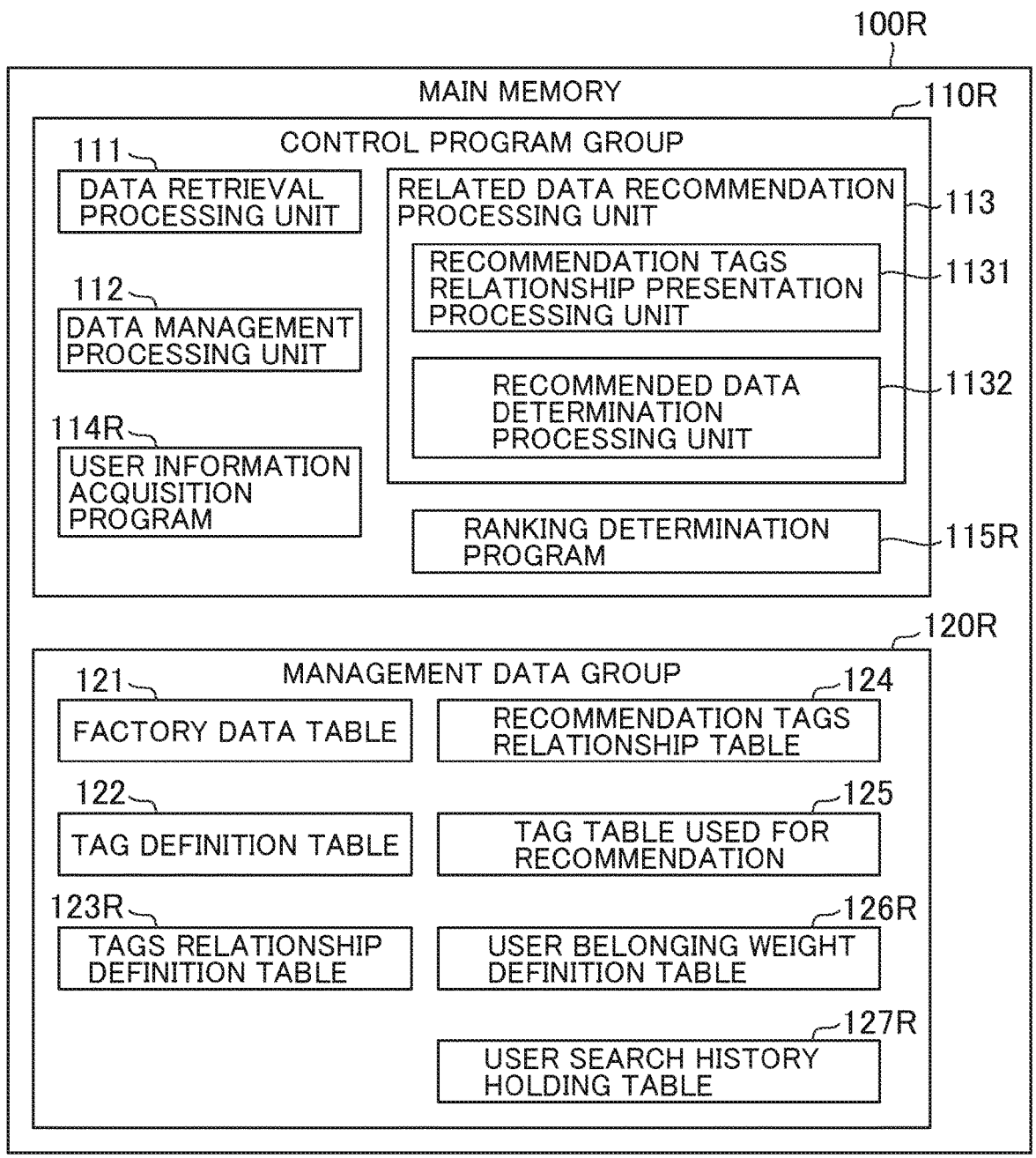
FIG. 18 shows a detailed configuration of a data management server in a second embodiment.

FIG. 18 shows a detailed configuration of a data management server 10 in the second embodiment.

A main memory 100R stores a control program group 110R and a management data group 120R. The control program group 110R includes a data retrieval program 111, a data management program 112, a related data recommendation program 113, a user information acquisition program 114R, and a ranking determination program 115R. The data retrieval program 111, the data management program 112, and the related data recommendation program 113 are the same as each component in the first embodiment shown in FIG. 2. The user information acquisition program 114R is provided with a function for acquiring information of users via a network interface (I/F) 150. The ranking determination program 115R is provided with a function for ranking recommended data.

The management data group 120R includes a factory data table 121, a tag definition table 122, a tags relationship definition table 123R, a recommendation tags relationship table 124, a tag table 125 used for recommendation, a user belonging weight definition table 126R, and a user search history holding table 127R. The factory data table 121, the tag definition table 122, the recommendation tags relationship table 124, and the tag table 125 used for recommendation are the same as the components in the first embodiment shown in FIG. 2.

The tags relationship definition table 123R is acquired by applying weight information between tags to the tags relationship definition table 123 in the first embodiment and details will be described referring to FIG. 19 below. The user belonging weight definition table 126R is a table defining belonging information and weight of tags and details will be described referring to FIG. 20 below. The user search history holding table 127R is a table holding a search history of a user and details will be described referring to FIG. 21 below. In addition, information recorded in the user belonging weight definition table 126R and the user search history holding table 127R is stored in a storage 140 at predetermined timing (for example, periodically).

FIG. 19 shows a configurational example of the tags relationship definition table 123R including weight information in the second embodiment.

The tags relationship definition table 123R is a table to which a degree of relationship between tags is applied to the tags relationship definition table 123 in the first embodiment shown in FIG. 5. The tags relationship definition table 123R includes fields of a record number 123R0, a relationship name 123R1, a key tag 123R2, a relation tag 123R3, and a relationship degree 123R4.

The record number 123R0, the relationship name 123R1, the key tag 123R2 and the relation tag 123R3 are the same as the record number 1230, the relationship name 1231, the key tag 1232 and the relation tag 1233 in the tags relationship definition table 123 in the first embodiment. The relationship degree 123R4 defines a degree of relationship between a certain key tag 123R2 and its relation tag 123R3. The relationship degree may also be defined by a numeric value such as a fractional value and an integral value and may also be defined by classification such as "high, intermediate, and low".

For example, as shown in a third record in the tags relationship definition table 123R, a degree of relationship between "assembly process" in the field of the key tag 123R2 corresponding to "relationship to anterior process" in the field of the relationship name 123R1 and "press process" in the field of the relation tag 123R3 is 0.8, and a degree of relationship between "assembly process" in the field of the key tag 123R2 and "coating process" in the field of the relation tag 123R3 is 1.0.

FIG. 20 shows a configurational example of the user belonging weight definition table 126R in the second embodiment.

In the user belonging weight definition table 126R, relationship information between information tags such as a belonging department of a user is recorded. The user belonging weight definition table 126R includes a record number 126R0, a belonging department 126R1 and a relation tag 126R2. The record number 126R0 is a number for specifying a record. The belonging department 126R1 records a department of a user searching data. The relation tag 126R2 defines a tag related to each belonging department 126R1 and data having a tag related to the corresponding belonging department is recommended.

For example, as shown in a first record in the user belonging weight definition table 126R, "worker list", "duty information" and the like are defined respectively in the field of the relation tag 126R2 for "general affairs d." in the field of the belonging department 126R1. In addition, as shown in a second record in the user belonging weight definition table 126R, "production planning", "production procedure", "design specification" and the like are defined in the field of the relation tag 126R2 for "production planning d." in the field of the belonging department 126R1.

In this case, in place of the belonging department 126R1, information of a task in charge may also be used. Moreover, weight information may also be added to the relation tag 126R2.

FIG. 21 shows a configurational example of the user search history holding table 127R in the second embodiment.

The user search history holding table 127R holds information of data searched by a user in the past and is defined every user. The user search history holding table 127R includes a record number 127R0, acquired data 127R1 and a tag 127R2. The record number 127R0 is a number for specifying a record. In a field of the acquired data 127R1, data searched by a certain user in the past are recorded. A field of the tag 127R2 records tags applied to the acquired data 127R1.

For example, in the user search history holding table 127R, "working machine sensor sampling.csv" is recorded in the field of the acquired data 127R1 as acquired data acquired by a user, and "facility sensor", "operation log", "working process" and the like are recorded in the field of the tag 127R2 as a tag applied to "working machine sensor sampling.csv".

Figure 22:
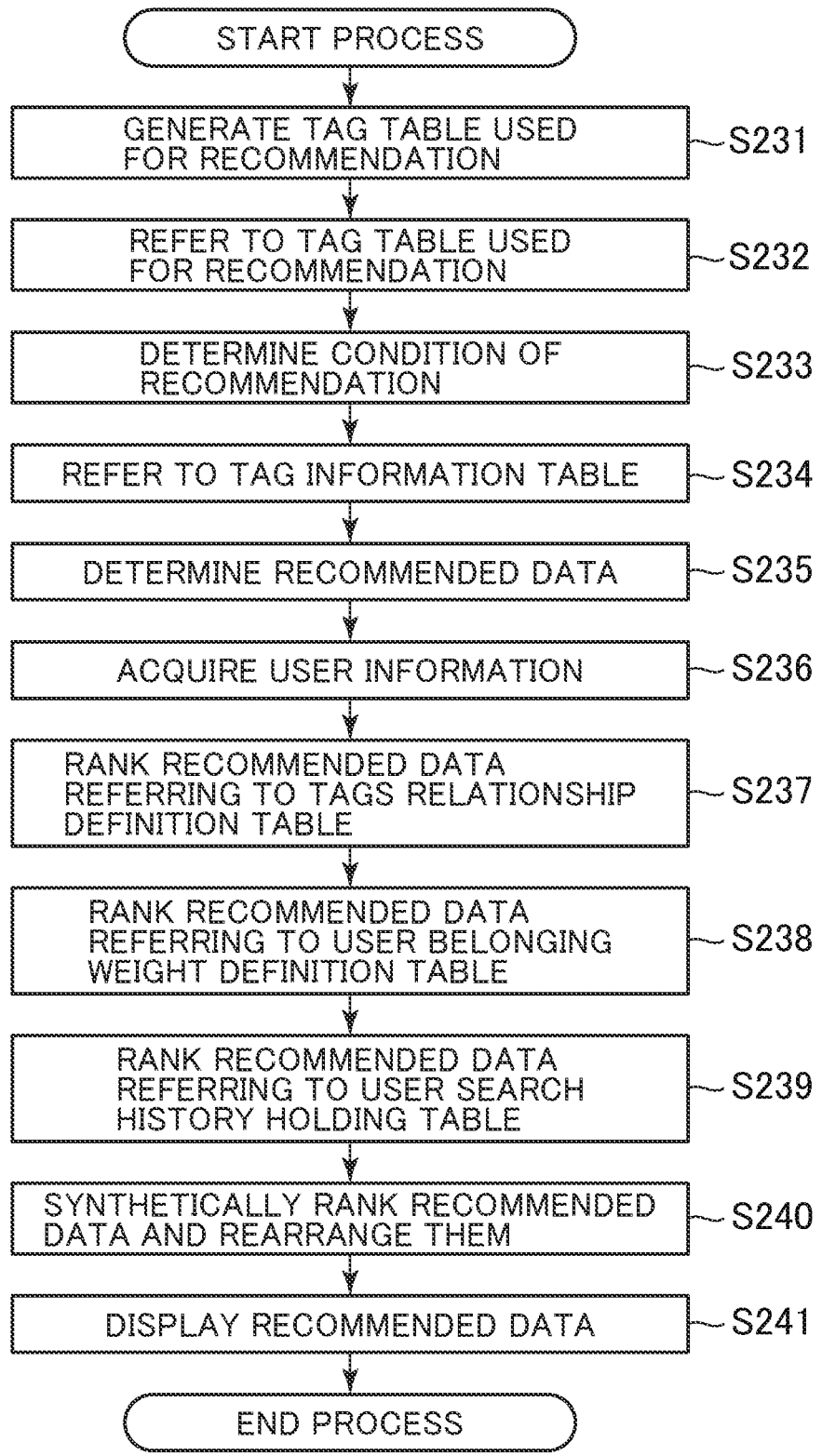
FIG. 22 is a flowchart showing a process for ranking recommended data in the second embodiment.

FIG. 22 is a flowchart showing a process for ranking recommended data in the second embodiment.

Steps S231 to S235 are the same as the steps S131 to S135 in the related data recommendation process (see FIG. 14) in the first embodiment.

After the step S235, the user information acquisition program 114R acquires information of a user via a network interface (I/F) 150 (a step S236). Next, the ranking determination program 115R acquires a degree of relationship between tags 123R4, referring to the tags relationship definition table 123R and ranks the recommended data determined in the step S235 using the acquired degree of relationship 123R4 (a step S237). In addition, the ranking determination program retrieves a belonging department 126R1 which is coincident with belonging information of the user acquired in the step S236, referring to the user belonging weight definition table 126R and acquires a relation tag 126R2 corresponding to the coincident belonging department. The ranking determination program ranks the recommended data determined in the step S235 using the acquired relation tag 126R2 (a step S238). Further, the ranking determination program acquires acquired data 127R1 and a tag 127R2, referring to the user search history holding table 127R related to the user information acquired in the step S236. The ranking determination program ranks the recommended data determined in the step S235 using the acquired data 127R1 and the acquired tag 127R2 (a step S239). The ranking determination program synthetically ranks the recommended data determined in the step S235 on the basis of the information ranked in the steps S237 to S239, rearranges the data in ranked order (a step S240), and instructs to display the ranked data (a step S241).

Ranking processing in each step will be described in detail below. First, ranking depending upon weight of relationship between tags in the step S237 will be described. For example, a case that an "assembly process" tag is applied to the acquired data referred to in the step S231, "relationship to anterior process" is determined on the basis of the tags relationship information referred to in the step S232 and selected by a user as a condition of recommendation, and a "press process" tag, and a "coating process" tag are applied to the recommended data determined in the S235 will be described below. In this case, the third record in which "relationship to anterior process" as the relationship name 123R1, "assembly process" as the key tag 123R2, and "press process" and "coating process" as the relation tag 123R3 are written is acquired, referring to the tags relationship definition table 123R shown in FIG. 19 in the step S237, and a degree of relationship 123R4 in the acquired record is referred to. The data is rearranged on the basis of the degree of relationship being a coefficient between/among the relation tags applied to the recommended data determined in the step S235 so that the data to which the "coating process" tag having a relationship degree of 1.0 is applied is rearranged in high order and the data to which the "press process" tag having a relationship degree of 0.8 is applied is rearranged in low order.

Next, ranking on the basis of belonging information of a user in the step S238 will be described. For example, when "quality management d." as belonging information of a user as a result that belonging information of the user is acquired in the step S236, "quality inspection", "defective information" and the like are acquired as the relation tag 126R2 corresponding to "quality management d.", referring to the user belonging weight definition table 126R (see FIG. 20) in the step S238. Coefficients of relation tags defined in the user belonging weight definition table 126R such as "quality inspection" and "defective information" in the recommended data determined in the step S235 are made larger, and rearrangement is made so that data to which these tags are applied, for example, "body panel quality inspection-.rdb" is ranked in high order.

Further, ranking depending upon a search history in the past of a user in the step S239 will be described. For example, user information is acquired in the step S236 and a user search history holding table 127R of the user acquired in the step S236 is referred to (the step S239). Next, the number of tags applied to data acquired in the past is counted for every tag, referring to the field of the tag 127R2 in the user search history holding table 127R and the tags applied to many data pieces acquired in the past are acquired. For example, in the user search history holding table 127R shown in FIG. 21, the tag "operation log" is applied to many data pieces. A coefficient of the tag such as "operation log" defined in the user search history holding table 127R in the recommended data determined in the step S235 is made larger and rearrangement is made so that data to which these tags are applied is ranked in high order (the step S239). In addition, for another example, in addition to the abovementioned ranking, a method such as collaborative filtering is used, and data often referred to by a person belonging to the same department as a user and data to which an often used tag is applied may also be rearranged to be in high order.

Further, in the step S240, the recommended data is synthetically ranked on the basis of the ranking acquired from the step S237 to the step S239, the recommended data is rearranged in order of the ranking, and the recommended data is displayed in the order of the ranking in the step S241. A relationship degree may also be displayed together with the recommended data. Furthermore, the synthetic ranking in the step S240 may also be the sum or the product of results acquired by individually ranking from the step S237 to the step S239, and weighting may also be applied to the results of the ranking. For example, weighting may also be applied depending upon the number of data used for ranking. More specifically, when the number of records in the user search history holding table 127R referred to in the step S239 is small (for example, pieces equal to or below 5), a weighting coefficient applied to the ranking result in the step S239 is made small. Hereby, an effect of ranking having small data volume and having low reliability is decreased. In addition, order of execution from the step S237 to the step S239 may also be a flow except the shown flow, only some of the processing in the steps S237 to S239 may also be executed, and ranking by another method may also be used together.

As described above, as the data management system in this embodiment is provided with the recommendation tags relationship presentation program 1131 for presenting relationship between tags to a user so as to request the user to select relationship between tags and the recommended data determination program 1132 for determining related data to be recommended on the basis of tags applied to the data acquired in retrieval referring to the selected relationship between tags, related data based upon the data acquired in retrieval can be acquired in a short time and retrieval time can be reduced. In addition, data narrowed according to a purpose of a searcher can be recommended and precision of recommendation can be enhanced.

Moreover, when ordering of tags defined according to the process is used for relationship between tags, a cause of defective data can be specified, following the upstream side of the process. Additionally, when classification of processes is used for relationship between tags, directivity in acquiring related data is determined and the precision of recommendation can be enhanced. Further, when inclusive relation of the process is used for relationship between tags, related data can be acquired according to the inclusive relation of the process.

Furthermore, as the tags relationship definition table 123 in which relationship between tags is defined and the recommendation tags relationship table 124 in which relationship between specific tags is recorded are held, the recommendation tags relationship presentation program 1131 specifies relationship between tags applied to data acquired in retrieval on the basis of the tags relationship definition table 123 and the program records the relationship in the recommendation tags relationship table 124, relationship between tags used for recommending data is narrowed and precision of recommendation can be enhanced. Furthermore, choices having stronger relationship can be presented to a user by presenting the narrowed relationship between tags to the user and labor of the user can be reduced.

Furthermore, the tag table 125 used for recommendation in which relationship between tags used for recommendation is recorded is held, the recommendation tags relationship presentation program 1131 presents the relationship between tags recorded in the recommendation tags relationship table 124 to a user, the program records the relationship between tags selected out of the presented relationship between tags in the tag table 125 used for recommendation, and the recommended data determination program 1132 determines related data to be recommended out of tags applied to the acquired data, referring to the tag table 125 used for recommendation. Accordingly the data narrowed according to a purpose of the searcher can be recommended and the precision of recommendation can be enhanced.

Furthermore, as the recommended data determination program 1132 provides the interface (the recommendation condition selecting field 604) for selecting the method of calculating related data to be recommended and determines the related data to be recommended using the selected calculating method, a grade of recommending related data can be changed and data according to a purpose of a searcher can be recommended.

Furthermore, as the ranking determination program 115R that ranks related data using the coefficient determined for a tag showing relation between data acquired in retrieval and related data is provided and instructs to display the related data in order of ranking, the related data can be more clearly displayed.

The present invention is not limited to the abovementioned embodiments, and various variations and similar configurations according to an object of attached claims are included. For example, the abovementioned embodiments are described in detail to clarify the present invention and the present invention is not necessarily limited to the described embodiments having all the configurations. Furthermore, a part of the configuration of the certain embodiment may also be replaced with the configuration of another embodiment. Furthermore, the configuration of another embodiment may also be added to the configuration of the certain embodiment. Furthermore, a part of the configuration of each embodiment may also be added, deleted or replaced to/from/with another configuration.

Furthermore, each configuration, each function, each program, and each processing unit which have been respectively described above may also be realized by hardware by designing some or all of them with integrated circuits for example, and may also be realized by software in a case that a processor interprets and executes programs for realizing respective functions. In this case, a record medium that records program codes is provided to a computer and a processor provided to the computer reads the program codes stored in the record medium. In this case, the program codes themselves read from the record medium realize the functions of the abovementioned embodiments, and the program codes themselves and the record medium storing them configure the present invention.

Programs for realizing each function and information such as a table and a file can be stored in a storage such as a memory, a hard disk and a solid state drive (SSD) or in a record medium such as an IC card, an SD card and DVD.

Furthermore, the program codes for realizing the functions described in these embodiments can be installed using various programs such as assembler, C/C++, Perl, Shell, PHP and Java or script language.

Further, program codes of software for realizing the functions in the embodiments are stored in storage means such as a hard disk and a memory of a computer or in a storage medium such as CD-RW and CD-R by delivering the program codes via a network, a processor provided to the computer reads the program codes stored in the storage means and the storage medium, and the processor may also execute the program codes.

Furthermore, only the control lines and only the information lines which are respectively considered to be necessary for explanation are shown, and all control lines required for packaging and all information lines required for packaging are not necessarily shown. Actually, it is conceivable that almost all configurations are mutually connected.

What is claimed is:
1. A data management system,
wherein the data management system is configured by a computer provided with an arithmetic unit that executes predetermined processing and a storage connected to the arithmetic unit, comprising:
a management data unit that stores a plurality of structured data and a plurality of unstructured data, wherein the management data unit further comprises:
at least one data table,
a tag definition table,
a tags relationship definition table,
a recommendation tags relationship table, and
a tag table;
a presentation unit that presents relationship between tags to a user and accepts selection of the relationship between tags; and a determination unit that determines related data to be recommended on the basis of tags applied to data acquired in retrieval, referring to the selected relationship between tags.

2. The data management system according to claim 1, wherein at least one of order relation, classification, and inclusive relation between/among tags is used for relationship between the tags.

3. The data management system according to claim 1, holding tags relationship definition information in which relationship between tags is defined and recommendation tags relationship information in which relationship between specific tags is recorded,
wherein the presentation unit specifies relationship between the tags applied to the data acquired in the retrieval from the tags relationship definition information and records the relationship in the recommendation tags relationship information.

4. The data management system according to claim 3, holding tag information used for recommendation in which relationship between tags used for recommendation is recorded,
wherein the presentation unit presents relationship between tags recorded in the recommendation tags relationship information to a user;
the presentation unit records relationship between tags selected out of the presented relationship between tags in the tag information used for recommendation; and
the determination unit determines related data to be recommended on the basis of tags applied to acquired data, referring to the tag information used for recommendation.

5. The data management system according to claim 4,
wherein the determination unit provides an interface for selecting a method of calculating related data to be recommended; and
the determination unit determines related data to be recommended using the selected calculation method.

6. The data management system according to claim 1, comprising a ranking determination unit that ranks related data using coefficients determined for tags showing relationship between data acquired in retrieval and related data,
wherein related data is displayed in order of the ranking.

7. A related data recommendation method executed by a data management system,
wherein the data management system is configured by a computer provided with an arithmetic unit that executes predetermined processing and a storage connected to the arithmetic unit;
the method comprising:
a management data procedure in which a management data unit stores a plurality of structured data and a plurality of unstructured data, wherein the management data unit further comprises:
at least one data table,
a tag definition table,
a tags relationship definition table,
a recommendation tags relationship table, and
a tag table;
a presentation procedure in which the arithmetic unit presents relationship between tags to a user and accepts selection of the relationship between tags; and
a determination procedure in which the arithmetic unit determines related data to be recommended on the basis of tags applied to data acquired in retrieval, referring to the selected relationship between tags.

8. The related data recommendation method according to claim 7, wherein at least one of order relation, classification, and inclusive relation between/among tags is used for relationship between the tags.

9. The related data recommendation method according to claim 7,
wherein the data management system holds tags relationship definition information in which relationship between tags is defined and recommendation tags relationship information in which relationship between specific tags is recorded; and
in the presentation procedure, the arithmetic unit specifies relationship between tags applied to the data acquired in retrieval from the tags relationship definition information and records the specified relationship in the recommendation tags relationship information.

10. The related data recommendation method according to claim 9,
wherein the data management system holds tag information used for recommendation in which information of tags used for recommendation is recorded;
in the presentation procedure, the arithmetic unit presents relationship between tags recorded in the recommendation tags relationship information to a user;
in the presentation procedure, the arithmetic unit records the relationship between tags selected out of the presented relationship between tags in the tag information used for recommendation; and
in the determination procedure, the arithmetic unit determines related data to be recommended on the basis of tags applied to acquired data, referring to the tag information used for recommendation.

11. The related data recommendation method according to claim 10,
wherein in the determination procedure, the arithmetic unit provides an interface for selecting methods of calculating related data to be recommended; and
in the determination procedure, the arithmetic unit determines related data to be recommended using the selected calculation method.

12. The related data recommendation method according to claim 7,
wherein the arithmetic unit includes a ranking determination procedure for ranking related data using coefficients determined for tags showing relationship between data acquired in retrieval and related data; and
the arithmetic unit generates data for displaying the related data in order of the ranking.

* * * * *